Dec. 11, 1956 P. H. PETERS, JR., ET AL 2,774,039

METHOD OF VARYING THE OUTPUT FREQUENCY OF MAGNETRON OSCILLATORS

Filed June 22, 1950 3 Sheets-Sheet 1

Inventors:
Philip H. Peters, Jr.
Donald A. Wilbur,
by Paul A. Frank
Their Attorney.

Dec. 11, 1956 P. H. PETERS, JR., ET AL 2,774,039

METHOD OF VARYING THE OUTPUT FREQUENCY OF MAGNETRON OSCILLATORS

Filed June 22, 1950 3 Sheets-Sheet 2

Inventors:
Philip H. Peters, Jr.
Donald A. Wilbur,
by Paul A. Frank
Their Attorney.

Inventors:
Philip H. Peters, Jr.
Donald A. Wilbur,
by Paul A. Frank
Their Attorney.

United States Patent Office 2,774,039
Patented Dec. 11, 1956

2,774,039

METHOD OF VARYING THE OUTPUT FREQUENCY OF MAGNETRON OSCILLATORS

Philip H. Peters, Jr., Schenectady, and Donald A. Wilbur, Albany, N. Y., assignors to General Electric Company, a corporation of New York Application June 22, 1950, Serial No. 169,712
3 Claims. (Cl. 332—5)

The present invention relates to methods of developing frequency controllable oscillations and, in particular, relates to improvements in methods of operating magnetron apparatus for the purpose of obtaining frequency modulated electromagnetic energy.

Frequency modulation of sources of high frequency energy, such as magnetron oscillators, is becoming of increasing importance because of developments in television and related arts. Heretofore attempts have been made to frequency modulate magnetron oscillators by use of various expedients. For instance, there is disclosed in U. S. Patent 2,528,241, issued October 31, 1950, by Philip H. Peters and John P. Blewett, entitled Frequency Controllable Magnetron and assigned to the assignee of the present invention, methods and apparatus for modulating a magnetron oscillator by tuning the resonant circuit of the magnetron oscillator. The tuning of the resonant circuit is achieved by a second magnetron functioning as a reactance device to control the resonant frequency of the resonant circuit of the magnetron oscillator. With such an arrangement as disclosed in the aforementioned application, the amount of frequency variation that can be obtained is limited, and furthermore, an additional magnetron is required to produce the frequency controllable energy.

The present invention is directed to methods of operating magnetron oscillators whereby the frequency of a magnetron oscillator may be varied over wide ranges, for example, a frequency range having upper and lower frequency values in a ratio of the order of two to one at an operating frequency of several hundred megacycles; and further, the present invention is directed to achieving this highly desirable result by simple apparatus and procedure.

It is, therefore, an object of the present invention to provide means whereby high frequency energy, controllable in frequency, may be obtained.

It is a further object of the present invention to provide a method whereby the frequency of a magnetron oscillator may be varied over a broad band of frequencies.

It is another object to provide oscillator apparatus by means of which frequency modulated energy may be developed, and which is simple in construction and effective in operation.

Figure 1:
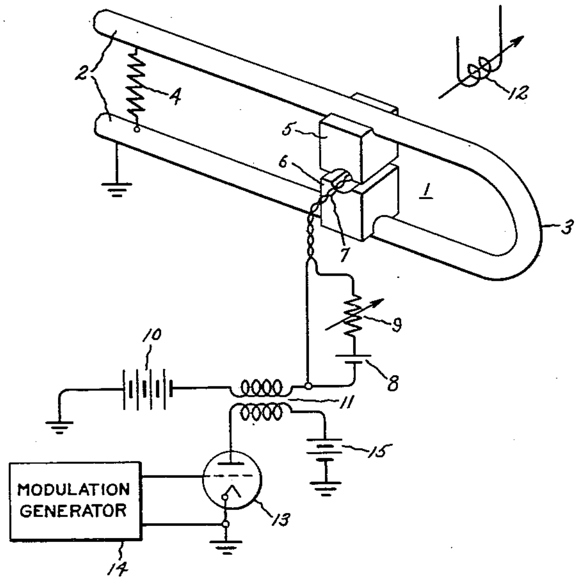
Figure 1A:
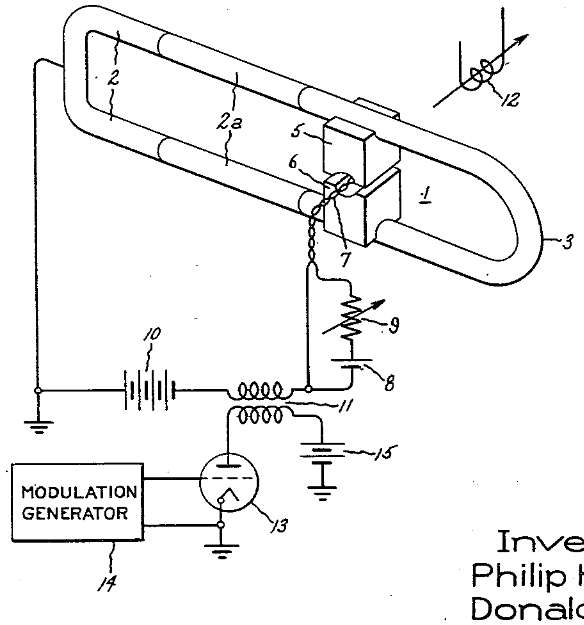
Figure 2A:
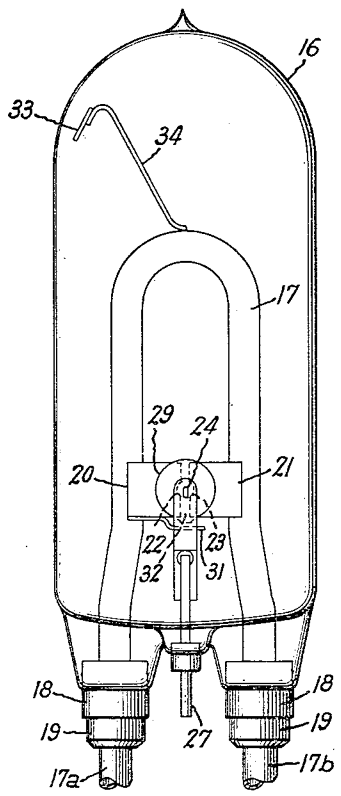
Figure 2B:
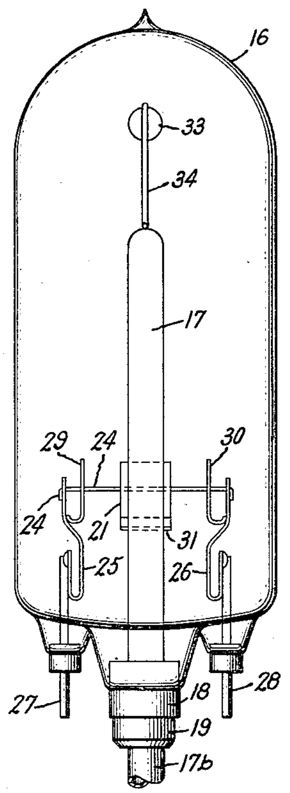
Figure 3A:
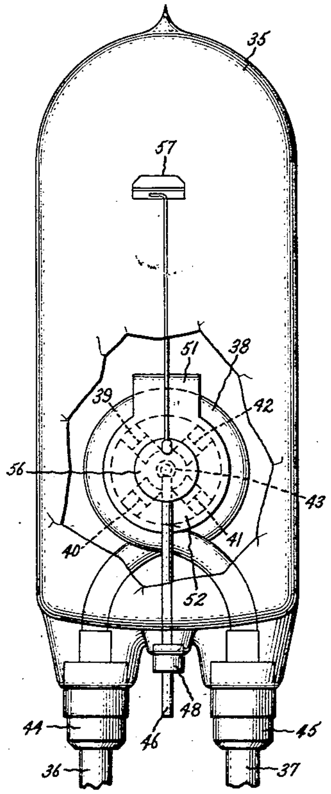
Figure 3B:
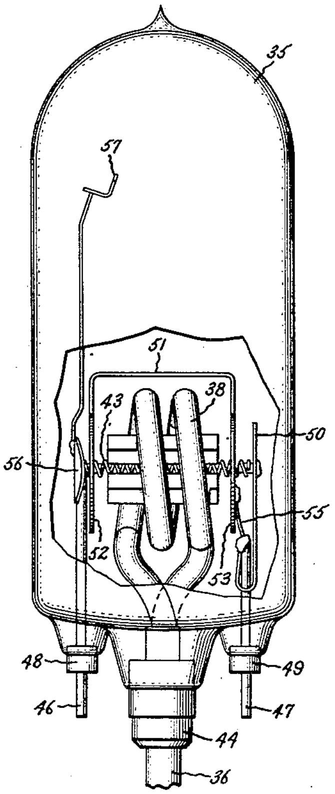
Figure 3C:
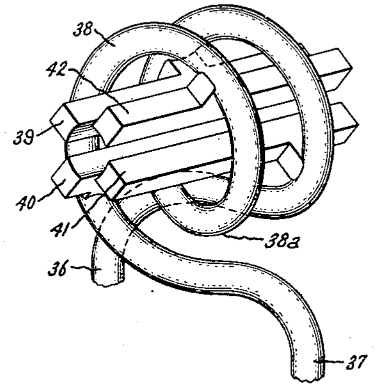

The features of the invention desired to be protected herein are pointed out in the appended claims. The invention itself, together with its further objects and advantages, may best be understood by reference to the following description taken in connection with the accompanying drawings in which Figs. 1 and 1A are semi-schematic representations showing apparatus by means of which the invention may be carried out; Figs. 2A and 2B show two views of a magnetron of the kind which may be used in the apparatus of Figs. 1 and 1A; Figs. 3A and 3B shows two views of another magnetron which may be used in the apparatus of Figs. 1 and 1A; Fig. 3C shows the anode structure of the magnetron of Figs.

Figure 4:
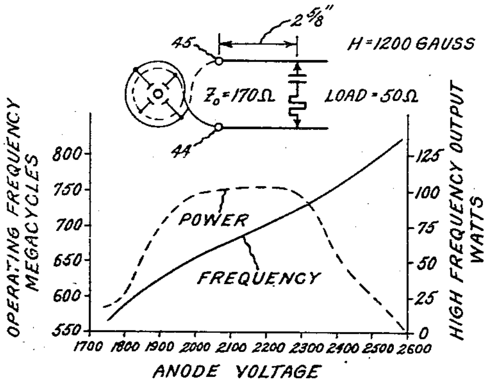

3A and 3B; Fig. 4 shows typical characteristics of the manner in which power and frequency vary with anode voltage for the magnetron device shown in Figs. 3A, 3B and 3C.

The embodiments of the invention shown in the drawings represent innovations in magnetron apparatus of the kind used to generate high frequency electromagnetic oscillations, whereby the frequency of operation may be made substantially independent of any resonant circuit and made dependent principally on either anode voltage, or magnetic field strength or both anode voltage and magnetic field strength. By either substantially increasing the loading of a magnetron or by reducing the usual cathode emission or by both increasing the loading and decreasing the emission, the frequency of the energy developed by the magnetron oscillator may be made variable over a broad band in response to the applied energization, for example, anode voltage, in accordance with principles to be explained below. While the embodiments of the invention shown in the drawings represent particular types of traveling wave magnetrons, it should be understood that the invention is applicable generally to all types of traveling wave magnetrons, and that the particular embodiments are shown principally for the purpose of explaining the invention.

As is well known, magnetrons are used in the high frequency field as generators of electromagnetic oscillations. Consider for the purpose of explaining the principles of our invention conventional magnetron apparatus comprising an anode, a cathode, a resonant circuit, and a load impedance. The anode comprises a pair of blocks having juxtaposed surfaces adapted to form a generally cylindrical chamber. The cathode is located on the axis of this cylindrical chamber. The resonant circuit is coupled to the anode blocks. The load impedance is connected to the resonant circuit. By the application of a suitable magnetic field directed axially with respect to the cylindrical chamber, and by the application of a unidirectional voltage between the cathode and the anode, electrons from the cathode are caused to flow from the cathode to the anode in generally circular paths. The net effect of the application of the magnetic field and the electric field to the discharge device is to produce a rotating space charge in the inter-electrode space between the cathode and anode. It should be noted that if the magnetic field is maintained constant, and if the electric field between the cathode and the anode is increased from a value of zero upwards the average angular velocity or drift velocity of the electron space charge will be increased. When the average angular velocity of the rotating space charge corresponds to the frequency of the resonant circuit, there results a conversion of energy from the unidirectional source into high frequency electromagnetic energy in the resonant circuit and in the load impedance.

With regard to the manner in which high frequency oscillations are developed it may be said that the electron space charge rotating in the interelectrode space induces "noise" voltages having frequency components corresponding to the frequency of the resonant circuit connected across the gaps formed by the anode blocks. The "noise" voltages are due to irregularities and random fluctuations in the rotating electron space charge. The magnitudes of the "noise" voltages are rather small; however, a component of the noise voltage corresponding to the resonant frequency of the resonant circuit is sufficient to induce a small voltage in the resonant circuit which voltage practically instantaneously causes the formation of a fringing electric field in the gaps between the anode blocks, which in turn causes a slight redistribution of the electrons in the rotating electron space charge, which in turn induces large voltages in the resonant circuit causing the rotating space charge to become further distorted and eventually to assume a cam shaped form.

In the steady state operation of the magnetron device the average angular velocity of the space charge and the frequency of the resonant circuit correspond, and in addition the phase of the fringing field from the resonator is synchronized with the cam shaped space charge so that the space charge does work against the fringing field across the gaps whereby a conversion of energy from the unidirectional source into the high frequency energy in the resonant circuit is effected. The high frequency electromagnetic field which extends between the gaps into the generally cylindrical space charge chamber has a component radial with respect to the axis of the chamber and also has a component tangential to the generally circular path of motion of the electron space charge. The radial component of the high frequency field either adds to or subtracts from the unidirectional field applied by energizing the anodes with a unidirectional positive potential, depending on the polarity of the high frequency field. When the high frequency voltage developed in the resonant circuit is of sufficient magnitude the electron space charge is kept in step with the frequency of the resonant circuit by alternate acceleration and deceleration of the electron space charge as it moves under an anode augmented in potential by the high frequency field and then moves under an anode decreased in potential by the high frequency field. The electron space charge also tends to be slowed down when it moves against the tangential component of the high frequency field. The energy lost by the electron space charge in moving against the high frequency field is transferred to the high frequency field. This basically constitutes the mechanism of conversion of energy from a unidirectional source into high frequency energy in a magnetron. It should be further pointed out that the process of transferring energy into the high frequency field and the process of developing a cam shape space charge by the high frequency field are practically simultaneous operations.

It will be noted that with the magnetron arrangement under consideration, as the unidirectional potential between the cathode and the anode is increased, the angular velocity of the electron space charge will tend to increase and will tend to fall out of synchronism with the resonant frequency of the resonant circuit. When the velocity is increased, the space charge current collected by the anode is increased and consequently, the energy input to the resonant circuit is increased, which means that the magnitude of the fringing field is increased. Thus, though the increased anode voltage tends to increase the angular velocity of the electron space charge, the increased magnitude of the fringing electric field between anode segments tends to slow the electron space charge down and keep it in step with the alternating high frequency fringing field. But this action does not operate completely to maintain the frequency of oscillation constant, as there is still normally a very small change in frequency as the anode voltage is increased. This effect is known in the art as "pushing."

It is pointed out in the operation of the above described conventional magnetron oscillator that the electron space charge is kept in step with the frequency of the resonant circuit by means of the fringing field appearing across the interaction gap of the magnetron oscillator even though the plate or anode voltage is increased. As the anode voltage is increased the avearge drift velocity of the electron space charge tends to increase thereby doing more work against the fringing field and transferring more power into the load or output circuit of the magnetron. The increased high frequency voltage across the load means the fringing field has increased in magnitude. Consequently while the forces tending to increase the average drift velocity of the electrons increase, at the same time the forces, principally the electric fringing field which opposes the increase in velocity of the electron space charge, also increase in a way so that the electron space charge is held in step with the resonant frequency of the resonant circuit. If the force holding the electron space charge in step, that is, the fringing electric field, is reduced in magnitude, the electron space charge may be made to fall out of synchronism with the resonant frequency of the resonant circuit. Whenever the rate of change of high frequency energy in the output circuit, or of the restraining effect on the electron space charge, with respect to anode voltage, is less than the rate of change of the impelling effect of the forces moving the electron space charge through the reaction of fringing field developed by the high frequency energy with respect to anode voltage, a condition is achieved in which the electron space charge is no longer in step with the resonant frequency of the resonant output circuit. When this condition is attained, under the proper conditions the frequency of the high frequency energy developed in the output circuit is determined by the average velocity of the space charge, that is, for a given magnetron in a given magnetic field the frequency of the energy developed in the output circuit is no longer determined by the resonant frequency of the output circuit but rather is determined by the anode voltage or energization applied to the magnetron.

One way of reducing the above described rate of change of high frequency voltage in the output circuit of the magentron is by increasing the anode loading. By increasing the loading sufficiently the frequency of the energy developed in the output circuit is made dependent principally on the anode voltage and substantially independent of the resonant frequency of the output circuit.

Another way of decreasing the rate of change of high frequency energy in the output circuit is by reducing the emission from the cathode. Reduction in emission means that less power is supplied to the load with increasing anode voltage. Consequently it is possible for the unidirectional anode voltage to predominate in determining the average angular velocity of the electron space charge. Preferably the condition at which the output frequency is substantially independent of the resonant frequency of the resonant circuit connected to the magnetron and at which the frequency is determined by the average drift velocity of the electron space charged is attained by both increasing the loading and reducing or limiting the cathode emission.

While the preceding discussion has assumed that the magnetron load comprises a resonant circuit it should be understood a resonant circuit is utilized because it is a convenient means of obtaining a high impedance. A non-frequency discriminating impedance, or an impedance having a substantially constant value over the desired band of frequencies, of suitable magnitude could as well be used. Preferably a magnetron with external connections to which the variable impedance may be connected is used.

The phenomenon described above is different from what is conventionally known in the art as "pushing" the magnetron. When a magnetron is operating as a conventional oscillator an increase in power output of the magnetron is obtained by increasing the anode voltage. The increased anode voltage produces only a slight increase in the average angular velocity of the electron space charge and the slight increase in the average angular velocity causes a slight increase in the frequency.

The nature of the effects described above in connection with the present invention will be better understood with respect to "pushing" by considering what happens to the frequency of the magnetron with increasing anode voltage as the loading on the output circuit is progressively increased. As the load is increased and while the magnetron is still operating as a conventional traveling wave magnetron the frequency deviation due to the increase in anode voltage will progressively increase. That is, as the loading is increased the amount of "pushing"

that can be obtained in the magnetron is increased. Eventually a point is reached wherein the barrier represented by forces tending to hold the electron space charge in synchronism with the resonant frequency of the resonant output circuit is broken through or overcome by the unidirectional electric field applied to the anode. When this threshhold condition is reached the frequency is determined by the anode voltage or energization and not by the frequency of the resonant circuit. Of course, the break through or threshhold condition can be achieved as well by reducing the cathode emission and preferably is attained by increasing the loading and reducing the cathode emission at the same time.

An appreciation and an understanding of the nature of the phenomena involved in the above operation of a magnetron will be obtained from a consideration of a few specific examples of magnetron operation.

Consider a traveling wave type of magnetron of the kind being discussed above. Assume that the ratio of the anode to cathode radius is appropriately chosen so that the high frequency electric field has a substantial radial component. Assume that the linear velocity of the electron space charge over the face of anode segments is proportional to anode voltage. For the sake of simplicity assume that the electron space charge velocity corresponds to the anode voltage, i. e. with an anode voltage of 1000 volts the velocity of the electron space charge would be 1000 units per second. Assume that the anode segments are one unit wide with a small gap between anode segments.

If 1000 volts of unidirectional positive potential without any high frequency voltage is applied to the anode, it will take 0.002 of a second for the electron space charge to pass under two adjacent anode segments $$\left(2\times\frac{1}{1000}=0.002\text{ sec.}\right)$$

If now 1100 volts of unidirectional potential are applied to the anode it will take 330 peak volts of high frequency voltage of substantially square wave form applied between adjacent anode segments to slow down the electron space charge so that it passes over two segments in 0.002 of a second, that is, it will take 330 volts of high frequency voltage to hold the electron space charge to the speed of the electron space charge at 1000 volts. Another way of expressing the idea is to say that it will take 330 volts of high frequency potential to hold the electron space charge in synchronism with resonant frequency of a resonant circuit connected between adjacent anode segments. The computation for the above figures is as follows:

Average velocity of electron space charge = Voltage applied to anode segments; hence $$\text{Time taken by electron space charge to pass under anode with positive high frequency potential}=\frac{1}{1100+330}\text{ seconds}=0.00070\text{ sec.}$$

$$\text{Time taken by electron space charge to pass under anode with negative high frequency potential}=\frac{1}{1100-330}\text{ sec.}=0.0013\text{ sec.}$$

$$\text{Time to pass under both anode segments}=0.00070+0.0013=0.002\text{ sec.}$$

Similarly with 1200 volts of unidirectional potential applied to the anode it will take 490 volts of high frequency potential to keep the frequency fixed. Likewise, with 1300 volts of unidirectional potential it will take 625 volts of high frequency potential to keep the frequency fixed. If the high frequency field developed by the space charge is less than these values with the applied unidirectional potential, the electron space charge does not stay in synchronism, and the frequency of oscillation developed is not determined by the resonant circuit connected between adjacent anode segments. This condition can be achieved as mentioned above by increasing the load or reducing the cathode emission or preferably by performing both of these operations.

Referring now to Fig. 1 there is shown apparatus for carrying out the invention comprising a parallel wire type of traveling wave magnetron 1 adapted to develop high frequency electromagnetic energy of controllable frequency. The parallel wire type of magnetron shown in this figure is shown by way of illustration and it should be understood that generally any of the other types of traveling wave type of magnetrons including those having more than two anode segments may be utilized in the apparatus.

Referring now to particularities of construction of the magnetron in this figure, there is shown a parallel wire transmission line 2 short circuited at one end by the fixed connection 3. At the other end there is connected a load 4. It should be understood that the load may represent other apparatus to which power is coupled. Near the end of the transmission line with the fixed short circuited connection 3 are located a pair of anode blocks 5 and 6 connected to the transmission line 2. On their inward sides the anode blocks 5 and 6 are shaped to form a generally cylindrical opening in which a cathode 7 is axially located. Battery 8 is shown for energizing the cathode. The amount of cathode emission may be controlled by the variable resistor 9 placed in series between the cathode 7 and the battery 8. A second battery 10 is shown for energizing the anodes 5 and 6. One end of the battery 10 is connected to ground and the positive end is connected through a transformer 11 to the cathode 7 as shown. A unidirectional magnetic field is supplied by any of a variety of means schematically indicated by a coil 12 in the drawing. The transformer 11, the primary of which is connected through an amplifier 13 to a source of modulation 14 permits a control of the anode voltage whereby the frequency of oscillation developed by the magnetron apparatus may be changed in accordance with the modulation. The secondary of the transformer 11 is connected in series with the anode supply voltage 10 and the primary is schematically indicated as connected through an amplifier 13 to a modulation generator 14. The battery 15 supplies anode power to the amplifier.

In utilizing the apparatus of Fig. 1 to develop high frequency electromagnetic energy of controllable frequency, the loading of the magnetron and the cathode emission are adjusted in accordance with principles heretofore explained and developed. A unidirectional magnetic field is applied axially to the interelectrode space between anodes 5 and 6 and cathode 7. By energizing the anodes 5 and 6 by means of the battery 10 and by means of modulation signals applied through the transformer 11 and amplifier 13, frequency modulated oscillations are developed in the load 4 in accordance with the modulation applied to the input of the amplifier 13. While the embodiment of Fig. 1 shows a resonant circuit 2 coupled to the anodes of the magnetron 1, it should be understood that a resonant circuit is used here because it is a convenient means of obtaining a high impedance of suitable value into which the magnetron 1 can operate.

Preferably, a distributed load such as shown in Fig. 1A is utilized in order to minimize the change of the impedance of the resonant circuit of the magnetron with operating frequency. The apparatus of Fig. 1A is essentially similar to the apparatus of Fig. 1 except that in place of load 4, distributed load elements 2A are used in Fig. 1A.

Referring now to Figs. 2A and 2B of the drawing, there is shown a magnetron device of the kind schematically shown in the system of Fig. 1. The magnetron device of Figs. 2A and 2B includes an envelope 16 formed of glass, within which is mounted a generally U-shaped conductor 17 which may be to advantage formed of copper tubing. The arms of the U-shaped tubing extend through the end wall of the envelope and are sealed thereto by suitable seal constructions including sleeves 18 and 19 which are joined, respectively, to the envelope and the arms of the U-shaped conductor and which may be made of a class of conventional compositions suitable for metal to glass sealing and comprising the elements of iron, nickel and cobalt. The conductor 17 includes portions **17*a* and 17*b* which extend to the exterior of the envelope to provide a parallel wire transmission line corresponding to the anode members of the parallel wire transmission line 2 of Fig. 1. Within the tube envelope a pair of anode members 20 and 21 corresponding to anode members 5 and 6 of Fig. 1 are supported in opposed relation from the opposite arms of the U-shaped conductor 17. The anode members are spaced at the inner ends thereof and provided with arcuate surfaces 22 and 23 respectively, which cooperate to confine the space charge of the device supplied by an elongated cathode 24. The cathode 24, which may be a tungsten wire, is supported on the axis of the generally cylindrical space defined by the curved face portions 22 and 23 of the anode segments by resilient supporting members 25 and 26. These supporting conductors are secured to relatively rigid lead-in conductors 27 and 28 respectively, which are, in turn, sealed through the end wall of the envelope in any suitable manner. Circular shielding members 29 and 30 are supported respectively, from the flexible conductors 25 and 26 on opposite sides of the anode structure to prevent electrons escaping from the interelectrode space from impinging on the glass walls of the envelope. Also, a shield member 31 may be connected to the anode member 20 and extends over the gap 32 to collect electrons escaping therefrom. A suitable getter 33 is supported near the inner wall of the envelope by conductor 34 secured to the end of the loop conductor 17**.

Referring now to Figs. 3A, 3B and 3C, there are shown the details of the construction of another type of traveling wave magnetron by means of which the invention may be carried out. There is shown a magnetron comprising generally an hermetically sealed envelope 35, enclosing a part of a resonant circuit such as a transmission line formed by the conductors 36 and 37 extending through the envelope 35 and a two-turn helix coil 38 which terminates the conductors. Within the helix coil 38 there are provided a plurality of anodes 39, 40, 41 and 42, each of which is conductively supported from a different point on the inner periphery of the helix 4 as by welding thereto. As is seen from the drawing, the anode electrodes are positioned in a generally cylindrical configuration by virtue of their attachment to the helix. Centrally of the helix 38 and therefore likewise centrally of the anode electrodes there may be provided a thermionic cathode 43 of any suitable type. In the drawing the cathode 43 is shown as comprising a spiral tungsten coil which may be coated with a suitable thermionic emissive material of types well known in the art.

Conductive connections may be made to the spiral through the envelope by means of any suitable hermetic glass to metal seals such as the seals 44 and 45 surrounding the lines 36 and 37 and permitting them to pass through the envelope wall. Similarly, conductive connections may be made to the cathode 43 by means by the leads 46 and 47 which pass through the envelope wall at similar glass to metal seals 48 and 49. The cathode 43 may be rigidly attached to the lead 46 at one end and at the other end to a spring tension member 50 rigidly secured to the lead 47. It will be understood that the spring member 50 will hold a cathode coil 43 fixed in its position relative to the helix 38 and anodes 39, 40, 41 and 42.

For the purpose of precluding excessive destructive bombardment of the envelope and the seals by electrons escaping from the generally cylindrical space charge region defined about the cathode by the anode electrodes, there may be provided a cathode end shield 51 having flat annular end members 52 and 53 surrounding the cathode at one end and juxtaposed to the respective end faces of the anodes. The members 52 and 53 may be joined by an integral cross bar for rigidity and for support. The entire structure may be fixedly positioned and supported within the envelope by means of a support 55 welded to the lead-in member 47 and to the member 53. An additional end shield 56 may be provided on the lead 46 and the upper end of the spring member 50 may be shaped to effect a similar result at the other end of the cathode if desired. A suitable getter may be provided on the getter support 57 welded to the lead or to the shield 56. The getter may be flashed in the well known manner during the evacuation process.

As indicated more clearly in Fig. 3C, the anode electrodes 39, 40, 41 and 42 are conductively supported from the helix as by welding thereto at different points on its inner periphery. For example, it will be seen that electrods 40 and 42 are connected to the helix at points displaced by 180 degrees from each other on the first turn of the helix while the electrodes 39 and 41 are similarly displaced from each other by 180 degrees on the second turn of the helix, the anodes 40 and 42 being symmetrically interpositioned between the anodes 39 and 41 as shown. The electrodes 39, 40, 41 and 42 are preferably positioned symmetrically about the axis of the envelope, that is, they are positioned about 45 degrees along the helix 38 from the intersection with the helical coil of a plane through the axis of the envelope 35 and spiral coil itself. Thus it will be seen that as one proceeds around the periphery of the anode configuration, alternate anode electrodes may be considered as connected to points which are on the lengthwise half of the coil 38 on one side of its lengthwise midpoint **38*a*, while the anode electrodes intermediate between these alternate ones may be considered as connected to points on the lengthwise half of the coil 38 on the other side of its lengthwise midpoint 38*a*. If, therefore, one lengthwise half of the coil becomes electrically positive and the other negative at any instant during high frequency oscillation of the tank circuit comprising the transmission line, the electrodes 39, 40, 41, and 42**, will be alternately positive and negative. The magnetron device shown in Figs. 3A, 3B and 3C is described and claimed in U. S. Patent No. 2,521,556, issued September 5, 1950 to Donald A. Wilbur, and assigned to the assignee of the present invention.

Referring now to Fig. 4, there are shown typical characteristics of frequency versus anode voltage and high frequency output power versus anode voltage for a magnetron of the type shown in Figs. 3A, 3B and 3C as obtained by actual operation under conditions to be pointed out below. The manner of connection of the magnetron of Figs. 3A, 3B and 3C to a section of transmission line and to a load is shown in the sketch appearing in Fig. 4 along with the characteristic curves. It will be understood that the aforementioned characteristic curves are shown by way of example only. A 50 ohm resistive load was connected in series with a capacitor of about 2 micromicrofarads between the conductors 36 and 37 of Fig. 3A at a point 2⅝ inches from the seals 44 and 45. Conductors 36 and 37 form a section of transmission line having a characteristic impedance of about 170 ohms. The axial magnetic field applied had a magnitude of 1200 gauss. The electron emission was reduced by approximately 60 percent from its normal value when operating as a conventionl magnetron.

By changing the position of the load along the transmission line, the power versus anode characteristic can be changed. As the load is moved closer to the seals the power characteristic curve becomes peaked at the high frequency end.

While we have shown and described particular embodiments of our invention, it will be obvious to those skilled in the art that various changes and modifications may be made without departing from our invention and its broader aspects and, we, therefore, aim in the appended claims to cover all such changes and modifications as fall within the true spirit and scope of our invention.

What we claim as new and desire to secure by Letters Patent of the United States is:

1. The method of voltage tuning a traveling wave magnetron including a cathode electrode providing an electron space charge, an axially extending segmented anode electrode structure, an output circuit coupled to said anode structure to establish a high frequency field between said segments when excited with high frequency energy, and means providing an axially extending magnetic field between the anode and cathode electrodes, which method comprises applying direct current potential between said anode and cathode, limiting the cathode electron emission and heavily loading the output circuit so that over a given range of anode-cathode potential the rate of change of the restraining force due to the high frequency electric field between said segments with respect to a change of anode-cathode potential is substantially less than the rate of change of impelling forces moving the space charge through said high frequency electric field with respect to the anode-cathode potential, and varying said anode-cathode potential within said range to vary the operating frequency of said magnetron.

2. The method of voltage tuning a traveling wave magnetron including a cathode electrode providing an electron space charge, an axially extending segmented anode electrode structure, an output circuit coupled to said anode structure to establish a high frequency field between said segments when excited with high frequency energy, and means providing an axially extending magnetic field between the anode and cathode electrodes, which method comprises applying direct current potential between said anode and cathode, limiting the cathode electron emission and heavily loading the output circuit so that over a given range of anode-cathode potential the rate of change of the restraining forces due to the high frequency electric field between said segments with respect to a change of anode-cathode potential is substantially less than the rate of change of impelling forces moving the space charge through said high frequency electric field with respect to the anode-cathode potential and varying said anode-cathode potential within said range to vary the operating frequency of said magnetron at a rate in megacycles per volt approximately equal to the ratio of the operating frequency divided by the operating voltage.

3. The method of voltage tuning a traveling wave magnetron including a cathode electrode providing an electron space charge, an axially extending segmented anode electrode structure, an output circuit coupled to said anode structure to establish a high frequency field between said segments when excited with high frequency energy, and means providing an axially extending magnetic field between the anode and cathode electrodes, which method comprises applying direct current potential between said anode and cathode, limiting the cathode electron emission to approximately 40% of cathode electron emission for normal tank tuned traveling wave magnetron operation and heavily loading the output circuit so that over a given range of anode-cathode potential the rate of change of the restraining forces due to the high frequency electric field between said segments with respect to a change of anode-cathode potential is substantially less than the rate of change of impelling forces moving the space charge through said high frequency electric field with respect to the anode-cathode potential and varying said anode-cathode potential within said range to vary the operating frequency of said magnetron at a rate of approximately 1 megacycle per 4 volt change in anode-cathode potential over a frequency range up to 2 to 1.

References Cited in the file of this patent

UNITED STATES PATENTS

| | | |
|---|---|---|
| 2,130,381 | Collas | Sept. 20, 1938 |
| 2,220,968 | Link | Nov. 12, 1940 |
| 2,540,764 | Steigerwalt | Feb. 6, 1951 |

FOREIGN PATENTS

| | | |
|---|---|---|
| 890,873 | France | Feb. 21, 1944 |